US010181059B1

(12) United States Patent
Brewton et al.

(10) Patent No.: US 10,181,059 B1
(45) Date of Patent: Jan. 15, 2019

(54) MODELING A PHYSICAL COMPONENT INTERFACE IN A UNIFIED MODELING LANGUAGE MODEL

(75) Inventors: Nathan E. Brewton, Wayland, MA (US); Jean-Yves Brunel, Paris (FR); Alan Moore, Belstone (GB); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1439 days.

(21) Appl. No.: 11/820,551

(22) Filed: Jun. 19, 2007

(51) Int. Cl.
  *G06G 7/48* (2006.01)
  *G06G 7/62* (2006.01)
  *G06G 7/64* (2006.01)
  *G06G 7/66* (2006.01)
  *G06G 7/68* (2006.01)
  *G06G 7/70* (2006.01)

(52) U.S. Cl.
  CPC .................................... *G06G 7/64* (2013.01)

(58) Field of Classification Search
  None
  See application file for complete search history.

(56) References Cited

U.S. PATENT DOCUMENTS

| 6,282,699 | B1 | 8/2001 | Zhang et al. |
| 6,874,146 | B1 | 3/2005 | Iyengar |
| 7,340,684 | B2 | 3/2008 | Ramamoorthy et al. |
| 2005/0071803 | A1 | 3/2005 | Cherdron et al. |
| 2005/0091602 | A1 | 4/2005 | Ramamoorthy et al. |
| 2005/0096894 | A1 | 5/2005 | Szpak et al. |
| 2005/0257194 | A1 | 11/2005 | Morrow et al. |
| 2006/0136482 | A1 | 6/2006 | Conn et al. |
| 2006/0155387 | A1 | 7/2006 | Pieronek |
| 2006/0200482 | A1 | 9/2006 | Tan |
| 2007/0198968 | A1 | 8/2007 | Shenfield et al. |

FOREIGN PATENT DOCUMENTS

WO    01/73546 A2    10/2001

OTHER PUBLICATIONS

Reich man et al. "Model Level Coupling of Heterogeneous Embedded Systems", Proc. 2nd RTAS Workshop on Model-Driven Embedded Systems, 2004, 12 pgs.*
Hause, M. "The SysML Modelling Language", Fifth European Systems Engineering Conference, Sep. 18-20, 2006, 12 pages.*

(Continued)

*Primary Examiner* — Saif A Alhija
(74) *Attorney, Agent, or Firm* — Harrity & Harrity, LLP

(57) ABSTRACT

Methods, mediums and systems are provided to enable a user to build and edit a UML model for a system containing one or more physical component, which includes the across variable and/or the through variable of the components. A UML model may include classifiers, such as classes, interfaces, datatypes, signals, components, nodes, use cases and subsystems, that describes the structural and behavioral features of the system. A UML model may include at least one of the classifiers that is described using the across variables and/or the through variables of the system. For example, the interface of a component in a UML model may be described using the across variables and/or the through variables of the component.

32 Claims, 9 Drawing Sheets

(56) References Cited

OTHER PUBLICATIONS

Vanderperren et al. "From UML/SysML to Matlab/Simulink: Current State and Future Perspectives", Proc. Design, Automation and Test in Europe Conf., Mar. 6-10, 2006, 1 page.*
Xu Weigao, "The Design and Implementation of the uModelica Compiler", 2005, 116 pages.*
The MathWorks, Simulink, Model-Based and System-Based Design, Using Simulink, Version 5, chpts. 4,7,9-11, 13-14, pp. 1-134 (2002).
Douglass, Bruce Powel, "Real Time URL, Third Edition, Advances in the UML for Real-time Systems," Addison Wesley (2004).
Marzolla, Moreno, "Simulation-Based Performance Modeling of UML Software Architectures," Ph.D. Thesis: TD-2004-1, Universita Ca' Foscari DI Venezia (2004).
Rational Rose, "Toolset Guide," retrieved online at ftp://ftp.software.ibm.com/software/rational/docs/v2002_r2/unix/pdf/RoseRT/toolsetguide.pdf.
Wikipedia, "Executable UML," retrieved online at http://en.wikipedia.org/wiki/Executable_UML (2006).
International Search Report for Application No. PCT/US2007/011798, dated Jan. 30, 2008.

* cited by examiner

MODELING A PHYSICAL COMPONENT INTERFACE IN A UNIFIED MODELING LANGUAGE MODEL

BACKGROUND OF THE INVENTION

The Unified Modeling Language (UML) is a modeling and specification language used in software engineering. UML is often used for modeling object-oriented programs. UML includes a standardized modeling notation that may be used to create an abstract representation—a UML model of a system. While UML was designed to specify, visualize, construct, and document software-intensive systems, UML is not restricted to modeling software and can be used for modeling systems in general. For example, UML can also be used for business process modeling, organizational structure modeling, language modeling, engineered system modeling and physical system modeling.

SUMMARY OF THE INVENTION

An exemplary embodiment provides a software architecture modeling environment or its variants or extensions that enable a user to model an interface between physical components. The term UML is used hereinafter to include UML and any of its variants and/or extensions, such as the SysML variant of UML with system-engineering extensions, the Advanced Architecture Description Language (AADL), etc.

In an exemplary embodiment, a user may specify across variables and/or through variables of a physical component to model a system containing one or more physical components. The term "across variable" refers to a variable measured with a gauge connected in parallel to an element of the system. For example, an across variable may include a position variable in a translational mechanical system, an angle variable in a rotational mechanical system, a pressure variable in a hydraulic system, a voltage variable in an electrical system, and/or a temperature variable in a thermal system. The term "through variable" refers to a variable measured with a gauge connected in series to an element of the system. For example, a through variable may include a force variable in a translation mechanical system, a torque variable in a rotational mechanical system, a flow rate variable in a hydraulic system, a current variable in an electrical system, and/or a heat flow variable in a thermal system.

In an exemplary embodiment, across variables and through variables may be considered in pairs. For example, (voltage, current), (pressure, flow rate), or (velocity, force). Such pairs are known as "energy domains," "across/through domains" or simply "domains." Some domains may be described with multiple pairs. For. example, a pneumatic system may be described with {(pressure, flow rate), (temperature, heat flow rate)}. The system need not have to be restricted to pairs or singleton pairs. It could be, for example, {(position, velocity), force}.

On a physical component interface, across and through variables may be shared as pairs at terminals. For example, an electrical terminal on a resistor has both a voltage at that terminal and current flowing through that terminal. Other names for the "terminal" may include "port," "conserving port," "connection," "conserving connection," "connector," "pin", etc.

An analogy similar to across-through terminology is "effort-flow." Conceptually, effort-flow descriptions are similar in that effort-flow descriptions decompose interactions among physical elements into pairs of variables. The effort-flow descriptions are distinct in that in across-through descriptions, electrical voltage is analogous to mechanical velocity and electrical current is analogous to mechanical force. In effort-flow, however, electrical voltage is analogous to mechanical force and electrical current is analogous to mechanical velocity.

In an exemplary embodiment, a UML model may include models of physical or non-physical components, with each component implementing one or more interfaces. An interface may have parameters with a name and a type, inputs with a name and a type, methods with a name and a type, etc. A physical component interface may include one or more terminals that have a name and whose type is their domain.

An exemplary embodiment may enable a user to build and edit a UML model containing an interface between physical components. The interface may be represented in the UML model with terminals (or connections) bound to a particular across/through domain. In an exemplary embodiment, a UML model may include classifiers, such as classes, interfaces, datatypes, signals, components, nodes, use cases and subsystems, that describes the structural and behavioral features of the system. The UML model may include at least one of the classifiers that are described using a terminal (or connection) associated with a particular across/through domain. For example, the interface of a component in a UML model may be described using a terminal associated with a particular across/through domain.

An exemplary embodiment may provide an action language for a UML model. The action language may support modeling real-time operations of a system that are at least partially defined in the UML model. An exemplary embodiment may provide a graphical programming environment for the action language. The graphical programming environment may support physical system modeling, such as mechanical system modeling, electrical system modeling, hydraulic system modeling, thermal system modeling, etc. The action language provided in the graphical programming environment may enable a user to realize the UML model described using the across variable and/or the through variables of a physical component. For example, the graphical programming environment may enable a user to realize the components of a UML model that support the interfaces of the components described in the UML model using terminals associated with a particular across-through domain.

The terms "graphical programming environment" and "graphical action language" are interchangeably used to refer to an environment that enables a user to design and/or execute a graphical program or model.

In accordance with one aspect, a computer-implemented method is provided for modeling a system containing at least a physical component. A user may be allowed to specify one or more terminals of the physical component associated with a particular across-through domain. A UML model may be built to include an interface of the physical component defined using the terminals. The UML model may be imported and processed in a graphical programming environment to add an action language for the UML model. One or more components of the UML model may be executed in the graphical programming environment with the action language for the UML model.

In accordance with another aspect, a medium is provided for use with a computing device holding instructions executable by the computing device for modeling a system containing at least a physical component. A user may be allowed to specify one or more terminals of the physical component associated with a particular across-through domain. A UML model may be built to include an interface of the physical component defined using the terminals. The UML model may be imported and processed in a graphical programming environment to add an action language for the UML model. One or more components of the UML model may be executed in the graphical programming environment with the action language for the UML model.

In accordance with another aspect, a system is provided for modeling a system containing at least a physical component. The system may include a user interface for enabling a user to specify one or more terminals of the physical component associated with a particular across-through domain. The system may also include a UML modeling environment for building a UML model that includes an interface of the physical component using the terminals. The UML model may be imported and processed in a graphical programming environment to add an action language for the UML model. One or more components of the UML model may be executed in the graphical programming environment with the action language for the UML model.

BRIEF DESCRIPTION OF THE DRAWINGS

The aforementioned features and advantages, and other features and aspects, will become better understood with regard to the following description and accompanying drawings, wherein.

DETAILED DESCRIPTION

Figure 1A:
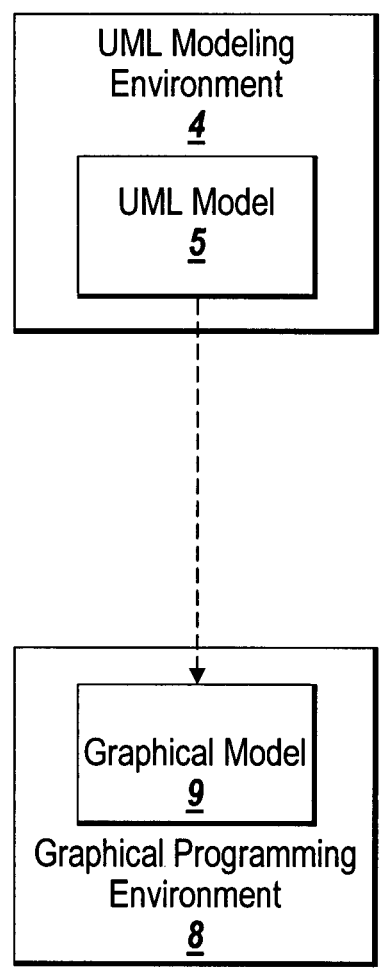
FIGS. 1A-1C depict exemplary embodiments in which a UML model and a graphical model are generated.

An exemplary embodiment provides a modeling environment that enables a user to build and edit a model or its variants or extensions for a system. The model may be defined in a Unified Modeling Language (UML) and/or in other software architecture modeling languages. A software architecture modeling language is a language that may be used for designing software architecture. A software architecture modeling language need not be used solely for modeling a software architecture. A system may include a logical component, such as a controller, and/or a physical component, such as a plant controlled by the controller. Likewise, the physical component may represent analog or digital computations. A physical component may be a single-domain or multi-domain system that includes one or more of a mechanical system, a hydraulic system, an electrical system, a thermal system, etc. Those of ordinary skill in the art will appreciate that the physical domains described above are illustrative and not limiting the scope of the present invention. Rather, a physical component may be in any domain that can describe the component using the tools of physics.

Furthermore, a component may be in any domain that can be described using a software modeling language such as, for example, the uniform modeling language (UML) or others. The scope of the embodiments of the invention is not limited to physical components.

In an exemplary embodiment, a user may specify across variables and/or through variables of a physical component. For example, a position variable, a linear velocity variable and a linear acceleration variable can be defined as across variables and a force variable can be defined as a through variable in a translational mechanical system. In a rotational mechanical system, an angle variable, an angular velocity variable and an angular acceleration variable can be defined as across variables and a torque variable can be defined as a through variable.

An exemplary embodiment may provide a user interface, such as an editor, that enables a user to build and edit a UML model for a system using across variables and/or through variables of the system. The UML model may be built to include elements that describe structural and behavioral features of the system. The UML model may include association, class, component, datatype, interface, node, signal, as well as extensions of these elements, such as a subsystem that can be described as a stereotype of a class. The UML model may also include objects that are instances of classes and links that are instances of associations. The UML model may further include UML model elements that specify how messages are exchanged over time or in a logical sequence among objects during an instance of an interaction.

In an exemplary embodiment, one or more elements of the UML model may be described to include the across variables and/or the through variables of a physical component. For example, a UML model may include a component that defines its interface using the across variables and/or the through variables of the component. Using the across variables and/or the through variables, a user is able to build and edit a UML model that describes a multi-domain system containing at least two different types of components, such as hydraulic, mechanical, electrical and thermal components.

An exemplary embodiment provides an action language for programming the behavior of a UML model. In an exemplary embodiment, a graphical programming environment is provided as an action language that enables graphical modeling of the behavior of a UML model so that the UML model can be executed. The graphical programming environment may represent a UML model using the blocks provided in the graphical programming environment. The graphical programming environment may provide physical modeling blocks for modeling a physical system.

An exemplary embodiment will be described below relative to a time-based block diagram environment. An exemplary time-based block diagram may be provided in the Simulink® environment from The MathWorks, Inc. of Natick, Mass. Although an exemplary embodiment will be described relative to the Simulink® environment, those skilled in the art will appreciate that the present invention may be practiced relative to other environments for capturing behavior. In alternative embodiments, a model may be defined in a textual or a combination of a graphical and textual environments. An example of a textual environment may be the MATLAB® environment from The MathWorks, Inc., of Natick, Mass., Modelica from Modelica Association, or VHDL-AMS. Examples of graphical modeling environments include but are not limited to those facilitated by the SimEvents® environment, the SimMechanics 2.2 environment or the SimDriveline 1.3 environment, all from The MathWorks, Inc., of Natick, Mass., LabVIEW from National Instruments Corporation of Austin, Tex. or to any tool that provides capabilities to capture behavior of UML models with extension to flow modeling of continuous or discrete data items between blocks and with extension to modeling properties of interconnected blocks as a set of mathematical equations or computational functionality to be solved.

The Simulink® modeling environment provides tools for time-based modeling and simulation of a variety of dynamic systems in one integrated, graphical environment. The Simulink® environment enables users to design a block diagram for a dynamic system, simulate the system's behavior, analyze the performance of the system, and refine the design of the system. The Simulink® environment allows users to design models of systems through a user interface that allows drafting of block diagrams representing systems. All of the blocks in a block library provided by the Simulink® environment and other programs are available to users when the users are building the block diagram. Individual users may be able to customize this block library to: (a) reorganize blocks in some custom format, (b) delete blocks they do not use, and (c) add custom blocks they have designed. The blocks may be dragged through some human-machine interface (such as a mouse or keyboard) from the block library onto the window (i.e., model canvas).

The Simulink® environment includes a block diagram editor that allows users to perform such actions as draw, edit, annotate, save, and print out block diagram representations of systems. The block diagram editor is a graphical user interface (GUI) component that allows drafting of block diagram models by users. In the Simulink® environment, there is also a textual interface with a set of commands that allow interaction with the graphical editor, such as the textual interface provided in the MATLAB® environment Using this textual interface, users may write special scripts that perform automatic editing operations on the block diagram. The Simulink® environment also allows users to simulate the models to determine the behavior of the systems. The Simulink® environment includes a block diagram execution engine that carries out the task of compiling and linking the block diagram to produce an "in-memory executable" version of the model that is used for generating code and/or simulating, verifying, processing, or otherwise analyzing a block diagram model.

FIG. 1A depicts an exemplary system 2 for implementing an exemplary embodiment. The system 2 may include a UML modeling environment 4 and a graphical programming environment 8. The UML modeling environment 4 enables a user to build an UML model 5 that complies with UML standards. A model may be a part or a component or an aspect of a larger model. The UML modeling environment 4 may be provided by various UML tools, such as Rational Software Architect from IBM of White Plains, N.Y., Rhapsody and TAU-2 from Telelogic AB, Sweden, Studio from Artisan, etc. With the UML tools, the user may create and edit UML diagrams that follow the graphical notation of the UML standards.

The model 5 can be exported into a text-based data format. The text-based data format may contain information on the graphical and non-graphical aspects of the UML model 5. The text-based data format may be described using the XML Metadata Interface (XMI) format. One of ordinary skill in the art will appreciate that the text-based data format may be described using other languages, including the Resource Description Framework (RDF) and markup languages, such as Hypertext Mark-up Language (HTML) and Standard Generalized Mark-up Language (SGML). Further, the text-based data format need not be a markup language format. For example, the text-based data format could be a text format or other canonical format. While a text-based data format is described here for illustrative purposes, the invention is not limited to text format and may also 'read' and transform the elements of a UML model using a direct programming API for accessing the UML information. For example, an alternative embodiment of the invention may have a programmatic interface using the EMF UML2 package of the Eclipse Modeling Project The text-based data format may be imported into the graphical programming environment 8, such as a block diagram environment. An exemplary embodiment may provide a tool for reading and analyzing the text-based data format and generating a graphical model 9 that can be simulated or executed in the graphical programming environment 8. With the graphical model 9, the graphical programming environment 8 enables a user or programmer to realize the UML model 5 so that the UML model can be executed in an interpreted, compiled, or mixed fashion. One of ordinary skill in the art will appreciate that the time-based block diagram environment is an exemplary graphical programming environment and the present invention may apply to other graphical programming environments, including state-based and flow diagrams, event-based diagrams, data flow diagrams, physical system diagrams, and entity flow networks.

Simulation may be in a single simulation loop, or multiple simulation loops may be modeled and executed. These simulation loops can be executed concurrently in separate threads, tasks, processes, or other forms of execution. The concurrent execution may be mimicked by two or more simulation loops using an interleaved execution to share, e.g., one thread. Simulation loops may be controlled separately by the user, for example to start, stop, and pause a simulation loop. Different configurations may be chosen for the separate simulation loops. For example, one simulation loop may be executed by using a variable step solver which may be based on implicit or explicit numerical integration schemes, while another simulation loop that is part of the same model may be executed by using a fixed step solver.

Figure 1B:
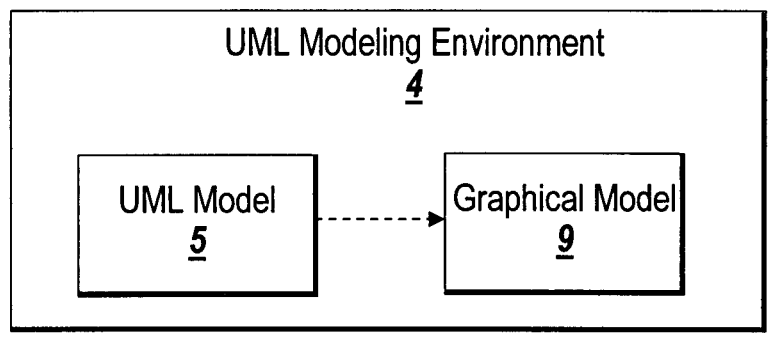
Figure 1C:
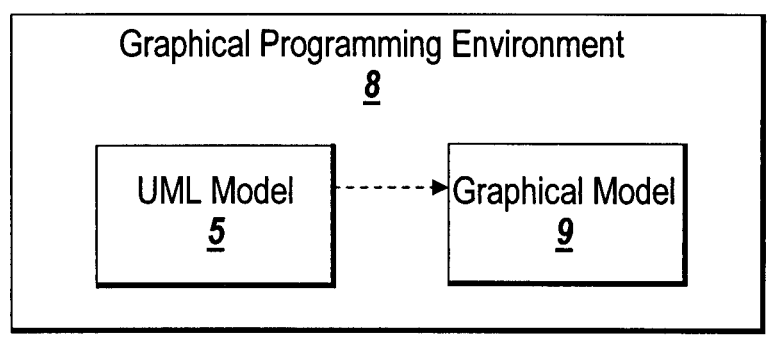

The system 2 described above is illustrative and not limiting the scope of the present invention. Rather, the system may be implemented in a single environment. For example, the UML model 5 and the graphical model 9 depicted in FIG. 1A can be built and edited in the same environment. FIG. 1B depicts an exemplary embodiment in which the UML model 5 and the graphical model 9 are built and edited in the UML modeling environment 4. In this case, the UML modeling environment 4 may provide the functionalities of the graphical programming environment 8 depicted in FIG. 1A. FIG. 1C depicts an exemplary embodiment in which the UML model 5 and the graphical model 9 can be built and edited in the graphical modeling environment 8. In this case, the graphical modeling environment 4 may provide the functionalities of the UML modeling environment 4 depicted in FIG. 1A.

Figure 2:
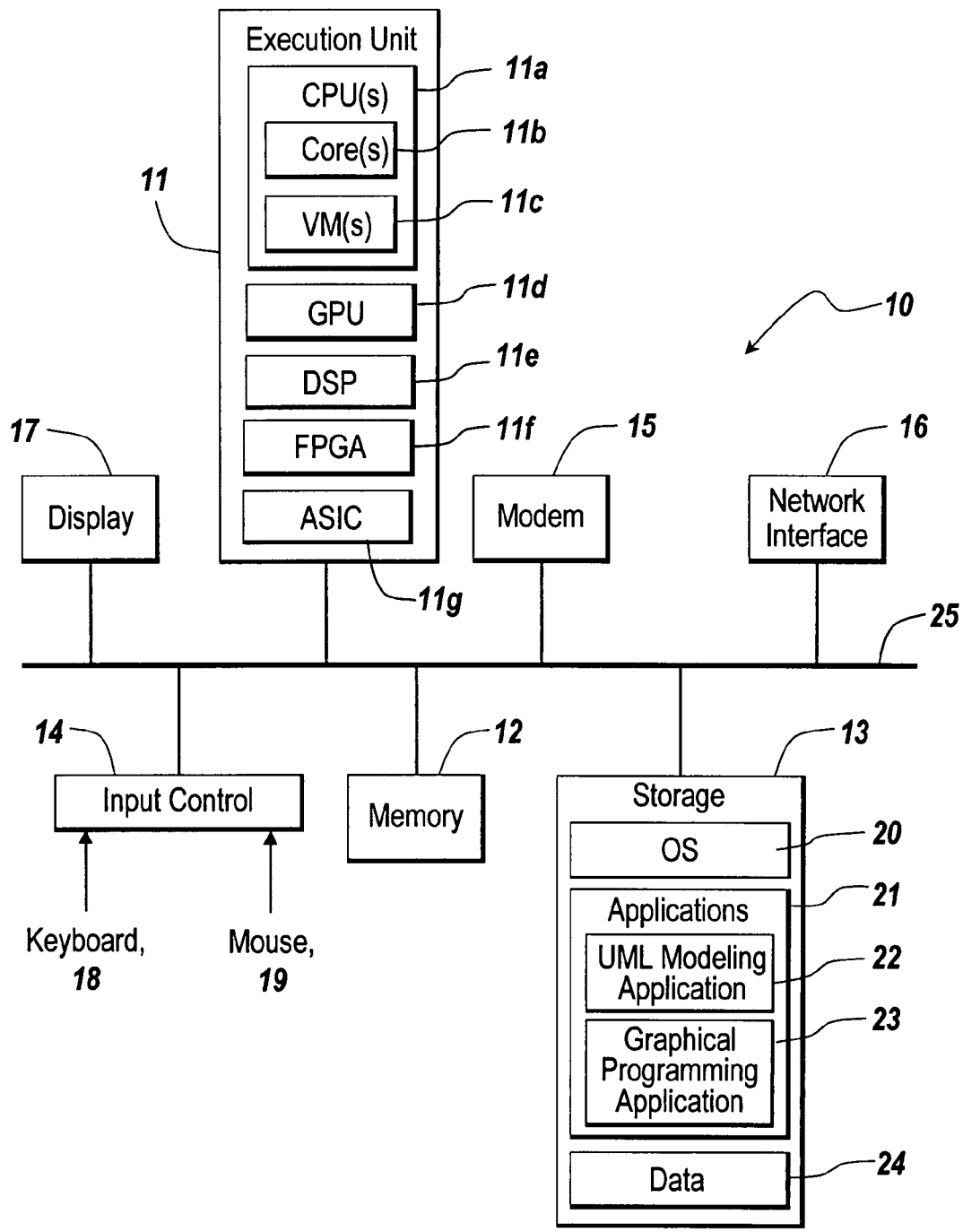
FIG. 2 is an exemplary electronic device suitable for practicing an exemplary embodiment.

FIG. 2 is an exemplary computing device 10 suitable for practicing an exemplary embodiment. The computing device 10 is intended to be illustrative and not limiting of the present invention. The computing device 10 may take many forms, including but not limited to a workstation, server, network computer, quantum computer, optical computer, bio computer, Internet appliance, mobile device, a pager, a tablet computer, and the like.

The computing device 10 may be electronic and include an execution unit 11, memory 12, storage 13, an input control 14, a modem 15, a network interface 16, and a display 17. The execution unit 11 controls each component of the computing device 10 to provide a modeling or programming environment. The memory 12 stores instructions and data and provides them to the execution unit 11 so that the execution unit 11 operates the computing device 10 and runs the modeling or programming environment. The storage 13 usually contains software tools for applications. The storage 13 includes, in particular, code 20 for the operating system (OS) of the device 10, code 21 for applications running on the operation system including a UML modeling application 22 and a graphical programming application 23, and data 24 for UML models and graphical models. Those of ordinary skill in the art will appreciate that the application can be stored in the memory 12 as well, much like the data, and even the OS, or they can be stored on the network described below with reference to FIG. 3.

Optionally, the computing device 10 may include multiple Central Processing Units (CPUs) 11a for executing software loaded in the memory 12, and other programs for controlling system hardware. Each of the CPUs 11a can include a single core or multiple cores 11b. The code loaded in the memory 12 may run in a virtualized environment, such as in a Virtual Machine (VM) 11c. Multiple VMs 11c may be resident on a single processor. Also, part of the application could be run in hardware (HW), for example, a graphics processing unit (GPU) 11d, a digital signal processor (DSP) 11e or by configuring a field programmable gate array (FPGA) 11f or creating an application specific integrated circuit (ASIC) 11g.

The input control 14 may interface with a keyboard 18, a mouse 19, and other input devices. The computing device 10 may receive through the input control 14 input data necessary for creating models, such as the selection of the attributes and operations of components in the models. The computing device 10 may also receive through the input control 14 input data necessary for controlling the execution of the models. The computing device 10 may present in the display 17 user interfaces for the users to create, edit, simulate, and execute the models. The resources depicted in FIG. 2 may be connected to each other through the bus 25. The bus 25 may be an on-chip, off-chip or network bus. The bus 25 may include a control-area network (such as CAN, FlexRay, TTP, ARINC for e.g. Automotive and avionic applications) bus.

Figure 3:
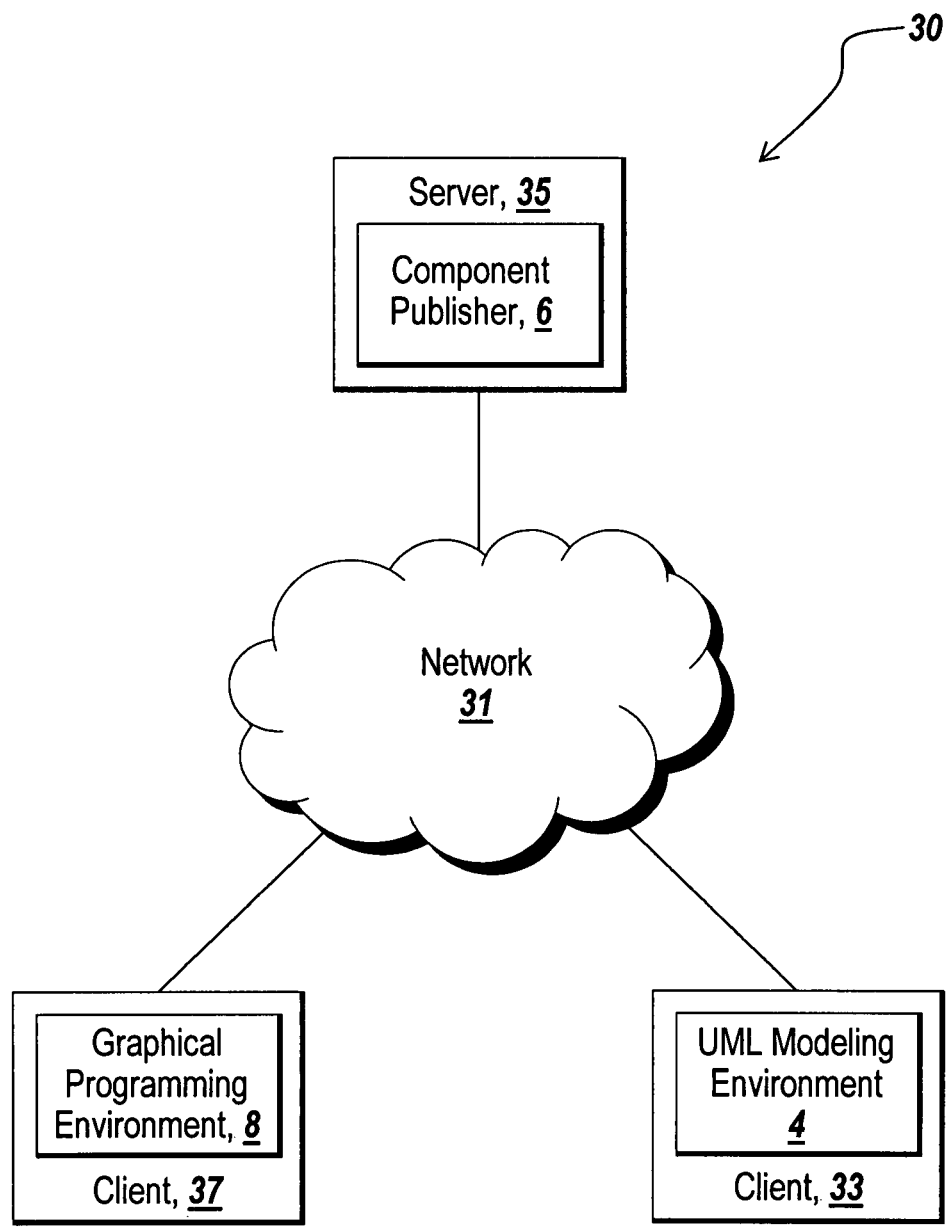
FIG. 3 depicts an exemplary network environment suitable for a distributed implementation.

FIG. 3 depicts an exemplary network environment 30 suitable for the distributed implementation of an exemplary embodiment. A server 35 and clients 33 and 37 may be coupled to the network 31 through communication links. The network interface 16 and the modem 15 of the computing device 10 (shown in FIG. 2) enable the server 35 to communicate with the clients 33 and 37 through the communication network 31. The communication network 31 may include a control-area network (such as CAN, FlexRay, TTP, ARINC for e.g. Automotive and avionic applications), Internet, intranet, LAN (Local Area Network), WAN (Wide Area Network), MAN (Metropolitan Area Network), BAN (Body Area Network), Wireless, Optical, etc. The communication facilities can support the distributed implementations. The network interface may employ a variety of connections including, but not limited to, standard telephone lines, LAN or WAN links (e.g., 802.11, 802.16, T1, T3, 56kb, X.25), broadband connections (e.g., ISDN, Frame Relay, ATM), cluster interconnection (Myrinet), peripheral component interconnections (PCI, PCI-X), wireless connections, or some combination of any or all of the above. The network interface may also employ or contain RSS feeds, Remote Method Invocation (RMI) components, and/or Remote Procedure Calls (RCP) components.

In an exemplary embodiment, the client 33 may include a UML modeling environment 4 that enables a user to build a UML model. The client 33 may send parts or all of the UML model to the server 35 for converting the UML models into a different format so that the UML model can be used in other modeling environments. The server 35 may include a publishing tool 6 for generating a corresponding representation of the components of the UML models that can be used in the graphical programming environment 8, such as blocks in graphical models. This representation may be in the form of a library file. This library may only contain blocks that have a corresponding representation in the UML model, and so restrict the user to only use blocks with a UML interpretation that are allowed.

Likewise, a block library may be provided that is configured towards a specific platform. For example, a library may only contain blocks that facilitate part or all of the standardized services of Automotive Open System Architecture (AUTOSAR). This may include blocks that correspond to the send and receive AUTOSAR FlowPort interface. These blocks may be provided in a general purpose interface as well and they may also be made available otherwise.

In order to convert the UML model, the publishing tool 6 may use the text-based data format exported from the UML model 5. The text-based data format contains metadata of the UML model. The publishing tool 6 may read and analyze the text-based data format and generate graphical models for the components of the UML models based on the information contained in the text-based data format. The server 35 then provides the graphical models to the client 37.

The client 37 may include the graphical programming environment 8 that enables a user to build and simulate/execute a graphical model. The client 37 may receive from the server 35 the graphical models of the components of the UML models and realize the methods of the components in the graphical programming environment 8. The realization of the methods of the components enables the UML model 5 to be simulated or executed so that the user can determine the behavior of the model 5.

Those of ordinary skill in the art will appreciate that the network structure is illustrative and the present invention can be practiced with different structure. For example, the publishing tool 6 can reside and run on the client 33 or 37. In an exemplary embodiment, the UML modeling environment 4 and the graphical programming environment 8 may reside on the same client. In an exemplary embodiment, the UML modeling environment 4 may provide the functionalities of the graphical programming environment 8 so that the UML model and the graphical model can be build and edited on the client 33. In an exemplary embodiment, the graphical programming environment 8 may provide the functionalities of the UML modeling environment 4 so that the UML model and the graphical model can be built and edited on the client 37.

In another embodiment, the client 33 or 37 may download the publishing tool 6 from the server 35 and perform the conversion process on the client 33 or 37.

An exemplary embodiment can be deployed on networked nodes, such as UNIX or Windows/XP terminals. It contains a workflow server that is notably responsible for managing a process between activities on several client applications and for maintaining the consistency of the UML model that is shared between these client applications.

The graphical programming environment client may request importing a UML model and observes the modifications of the model that result of user actions. On specific execution point of the process, it forwards these modifications to the server. The server is responsible for creating an updated version of the shared UML model with modified or new UML model elements. The server subsequently informs the other client applications that are part of the collaborative process of these modifications.

Figure 4:
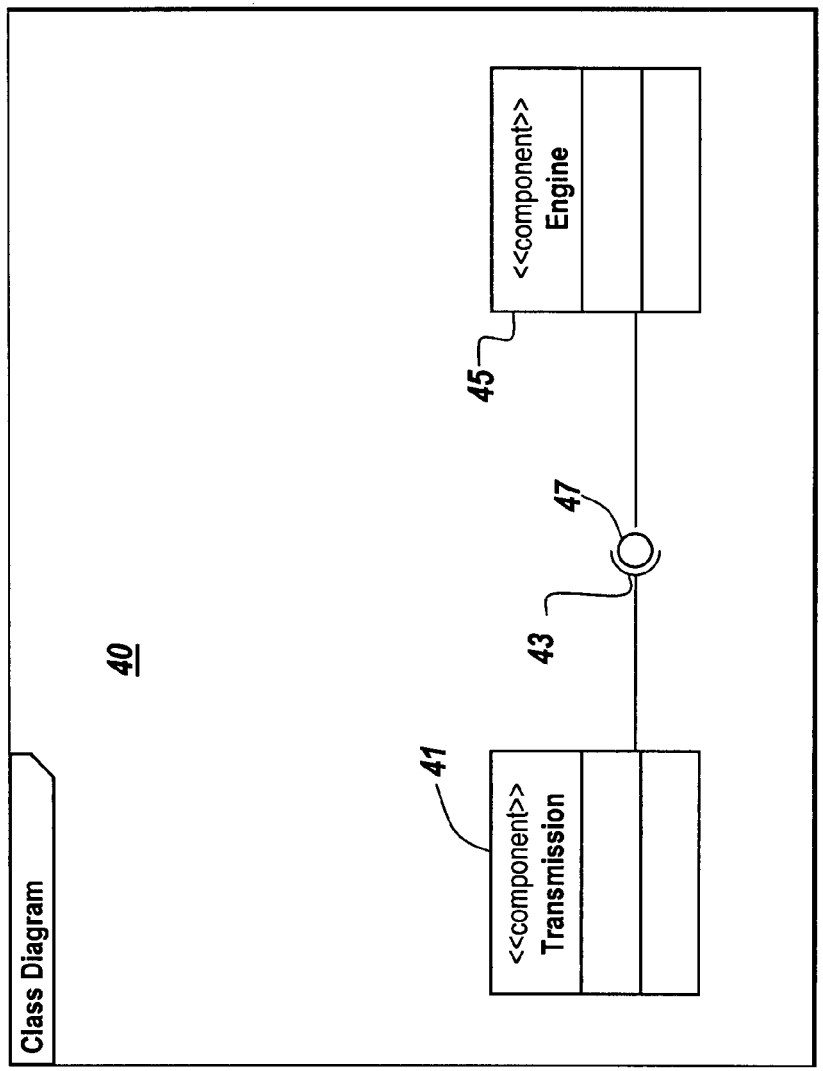
FIG. 4 is an exemplary component diagram of a UML model.

FIG. 4 is an exemplary component diagram 40 of a UML model 5. In an exemplary embodiment, the diagram 40 depicts a system including an engine unit and a transmission unit in a vehicle. The actual engine unit may include an engine, an axis coupled to the engine, sensors for detecting the parameters and variable values of the engine and an Engine Control Unit (ECU) for controlling the engine. The transmission unit may include an automatic or manual transmission, a clutch, axes coupled to the transmission and clutch and, for example, an ASIC for controlling the transmission. The component diagram 40 depicts how the system is split into components, and shows the dependencies of the components in the model 5. In an exemplary embodiment, the component diagram 40 includes Tansmission 41 and Engine 45 as its components to represent the transmission unit and the engine unit, respectively. In the component diagram 40 of a UML model, each component is a modular part of a system that hides its implementation behind a set of external interfaces.

The component diagram 40 also shows interfaces 43 and 47 between Transmission 41 and Engine 45. The interface 43 with a socket is referred to as a "required interface" meaning that the interface 43 is required by Transmission 41. That is, the interface 43 may define properties, operations or physical connections required or received by the transmission unit of a vehicle. The interface 47 with a ball on its connecting end is referred to as a "provided interface", which means that the interface 47 is provided by Engine 45. That is, the interface 43 may define properties, operations or physical connections provided or originated by the engine unit of a vehicle.

The syntactic representation provided is exemplary. Different forms of representing the interface connectors and the connections are possible. Referencing between connecting connectors need not be graphical. For example, GoTo and From labeled elements may be employed to establish connections. Also, direct connections between connectors may be establish by geographical proximity without the need for lines between the connectors.

The interfaces 43 and 47 may include a collection of properties or operations of the components 41 and 45 that specify the logical aspects of the components 41 and 45 and describe the externally visible behaviors of the components 41 and 45. For example, the interfaces 43 and 47 may specify the properties or operations of the components 41 and 45 to reflect that an Engine Control Unit (ECU) in the engine unit controls the engine and communicates with an ASIC in the transmission unit to enable the ASIC to control the transmission of a vehicle. The interfaces 43 and 47, however, do not include methods for implementing the operations. The operations can be realized using an action language, such as the graphical programming environment 9, for programming the methods of the operations specified in a UML model.

The interfaces 43 and 47 may also specify physical or continuous time connections between Transmission 41 and Engine 45. In an exemplary embodiment, the interfaces 43 and 47 may specify an axis coupled to the engine unit and the transmission unit of a vehicle to indicate that the torque generated in the engine is transferred to the transmission. In an exemplary embodiment, the interfaces 43 and 47 may specify a sensor that detects a parameter of the engine, such as the rotational movement and torque of the engine, and provides the parameter to the transmission unit for controlling the transmission of the vehicle.

In an exemplary embodiment, the interfaces 43 and 47 may specify one or more domains including logical and physical domains. In particular, the interfaces 43 and 47 may specify one or more physical domains, such as electrical connections, hydraulic connections, and mechanical connections between the transmission unit and the engine unit of a vehicle. In an exemplary embodiment, the physical interfaces may described in the UML model using Computer Aided Design (CAD) data of the system. In another exemplary embodiment, the physical interfaces may be described in the UML model using across variables and/or through variables of the system.

The interface information may be automatically generated. For example, when a dynamics model is derived from a CAD model, the across and through variables in an interface may be automatically generated. In other embodiments, an interface can be derived from connections in a model. For example, if a component can adapt to multiple interface specifications, it may select the desired interface specification once it is connected to other components. In one embodiment, this adaptation may be implemented by specifying some or all of the interface information is inherited. If a component that has an interface variable with a value with unit milli-volts is connected to an interface variable with inherited unit, the inherited unit may be inferred to be milli-volts as well. Likewise, if a variable of type integer is connected to a variable that inherits its type, the inherited type may be inferred to be integer as well. More complex inheritance and inferencing rules may be implemented, for example based on finding the superseding type in a type lattice.

An interface may have more than two connections. Different connection semantics may be employed. For example, in case of through variables in a connection, these may be equal or balanced (so their sum equals 0, accounting for their defined positive direction). Likewise, across variables in a connection may be equal or balanced. Connections with across and through variables may have one of the two follow equal semantics and the other balanced semantics. This could be to achieve power continuity across a connection if the product of the across and through variables constitutes power because if one of the two is balanced while the other is equal, the product is balanced.

Other connection semantics may be based on communication protocols such as publish/subscribe and handshake protocols or on transaction models such as bus protocols and shared memory accesses.

Figure 5:
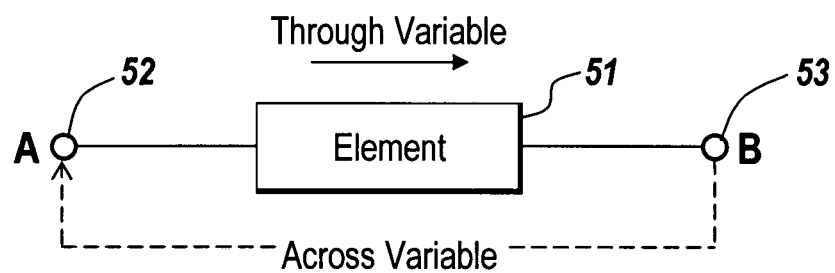
FIG. 5 depicts an exemplary physical component in which an across variable and a through variable are defined.

FIG. 5 shows a model of an exemplary physical element 51 in which an across variable (dotted line) and a through variable (arrow) are defined. The element 51 may be one of, for example, a conductor, a resistor, a capacitor, an inductor or an combination thereof in an electrical system, a thermal system and a hydraulic system. The element 51 may be a damper, a mass, a spring or a combination thereof in a translational mechanical system or a rotational mechanical system. An across variable may be defined as a variable measured with, for example, a gauge connected in parallel to the element 51. A through variable may be defined as a variable measured with a gauge connected in series to the element 51.

For example, the across variable may include a position variable in a translational mechanical system, an angle variable in a rotational mechanical system, a pressure variable in a hydraulic system, a voltage variable in an electrical system, and/or a temperature variable in a thermal system. The through variable may include a force variable in a translation mechanical system, a torque variable in a rotational mechanical system, a flow rate variable in a hydraulic system, a current variable in an electrical system, and/or a heat or enthalpy flow variable in a thermal system.

In an exemplary embodiment, each variable may be characterized by its magnitude and sign. The same variable can be positive or negative, depending on the polarity of a measurement gauge. For example, if the element 51 is oriented from node 52 (A) to node 53 (B), it implies that the through variable is positive if it flows from node A to node B, and the Across variable is determined as $AV=AV_A-AV_B$, where $AV_A$ and $AV_B$ are the potentials of node A and node B, respectively. The product of the across variable and the through variable is positive if the element 51 consumes energy, and is negative if it provides energy to a system. In alternative embodiments, system definitions may be reversed.

Figure 6:
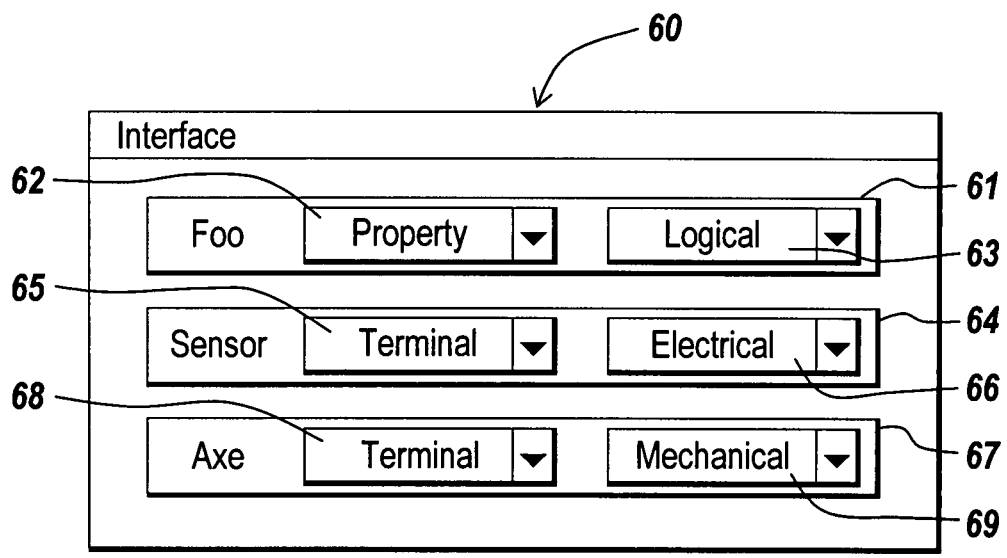
FIG. 6 shows an exemplary user interface for specifying interfaces of a component in a UML model.

FIG. 6 shows a user interface 60 that enables a user to specify the interfaces of Engine 45 depicted in FIG. 4. In an exemplary embodiment, the user interface 60 may include multiple panes, such as panes 61, 64 and 67, for defining multiple domain interfaces of Engine 45. For example, in pane 61, a user may select a property or operation 62 of the engine unit as the logical interface 63 of Engine 45. In pane 64, a user may specify one or more terminals 65 of a sensor in the engine unit as the electrical interface 66 of the Engine 45. In the electrical domain, the terminal 65 may be represented by an across variable (for example, a voltage variable), a through variable (for example, a current variable 65), or both. In pane 67, the user may also specify one or more terminals 68 of an axis in the engine unit as the mechanical interface 69 of the Engine 45. In the mechanical domain, the terminal 68 may be represented by a through variable (for example, a torque variable), an across variable (for example, a velocity variable), or both. There may be a library of domains, and each domain has a name and indicates its across-through pair(s). Each component in a UML model implements one or more interfaces. The interfaces of physical components are represented in the UML model using terminals that have a name and whose type is their domain.

In an exemplary embodiment, the interface of a physical component may be defined using computer-aided design (CAD) data in a UML model. An interface of a physical component may be represented in a UML model using CAD data that defines geometric compatibility of the interface, e.g., male and female 9-pin wiring harnesses.

Once a UML model is built the UML model may then be exported into a text-based data format, such as an XML Metadata Interchange (XMI) format. The XMI format is a standard for exchanging metadata information via the Extensible Markup Language (XML). The XMI format is the official Object Management Group (OMG) specification for exchanging model information between modeling tools and repositories. Since the XMI format is an XML standard, it is human-readable and can be viewed in a normal text browser. The XMI format can be read by the publishing tool 6 and saved as an XML document.

Figure 7:
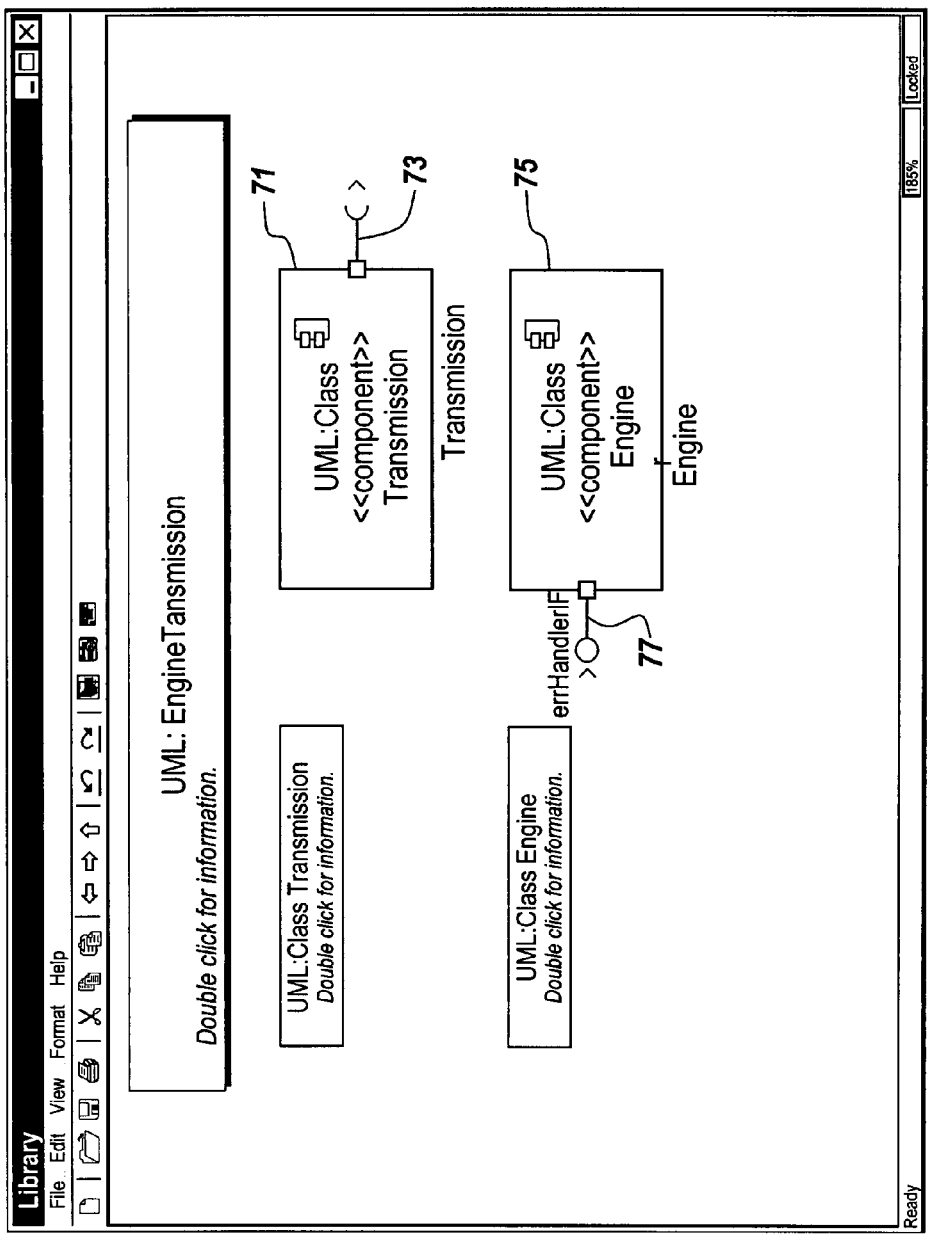
FIG. 7 shows exemplary graphical model blocks representing the components of a UML model in a graphical programming environment.

The publishing tool 6 may read the XMI file and generate hierarchical graphical models using the information contained in the XMI file 70. FIG. 7 shows exemplary hierarchical blocks generated by the publishing tool 6. The components of the UML model are converted into the hierarchical blocks of the graphical programming environment 8. For example, the block 71 may include sub-blocks and an interface 73 that support the interface 43 of the component 41 depicted in FIG. 4. The block 75 may also include sub-blocks and an interface 77 that support the interface 47 of the component 45 depicted in FIG. 4.

In each block 71 or 75, the user may graphically model the components 41 and 45 of a UML model to implement the methods of the operations specified in the interfaces 43 and 47 of the components 41 and 45. The action language may include time-based block diagrams, statecharts, entity flow diagrams, a control flow language, a dataflow language, a dynamically typed text-based language, and an imperative programming language. Like formalisms may be employed in alternative embodiments in addition or instead of these languages, as well as that any number of permutations of these languages can be employed as combinations. In alternative embodiment, languages may be configurable by, for example, using style sheets or removing blocks from the library (or visually marking them as unavailable). Alternatively, compilation may be disallowed until adherence to editing styles is resolved. In yet another embodiment, editing actions may be constrained based on style definitions.

In an exemplary embodiment, the graphical action language supports modeling of a physical system. The physical modeling defines physical connections or continuous time interfaces between physical elements of the system and may simulate the physical models to determine the behavior of the system. Exemplary tools for physical modeling can be found in the SimMechanics environment, the SimPowerSystems environment, the SimDriveline environment and the SimHydraulics environment, all from The MathWorks, Inc.

The SimMechanics environment extends the Simulink environment with tools for modeling and simulating mechanical systems. The SimMechanics environment is integrated with control design verification and code generation functionalities to enable a user to design and test controllers in real time with the model of the mechanical system.

The SimPowerSystems environment extends the Simulink® environment with tools for modeling and simulating basic electrical circuits and detailed electrical power systems. The SimPowerSystems environment allows a user to model the generation, transmission, distribution, and consumption of electrical power, as well as its conversion into mechanical power. The SimPowerSystems environment enables a user to develop complex, self-contained power systems, such as those in automobiles, aircraft, manufacturing plants, and power utility applications.

The SimDriveline environment extends the Simulink® environment with tools for modeling and simulating the mechanics of driveline (drivetrain) systems. The SimDriveline environment provides components, such as gears, rotating shafts, and clutches, standard transmission templates, and engine and tire models. SimDriveline is optimized for ease of use and speed of calculation for driveline mechanics. The SimDriveline environment is integrated with control design and code generation functionalities to enable a user to design and test controllers in real time with the model of the mechanical system.

The SimHydraulics environment extends the Simulink® environment with tools for modeling and simulating hydraulic power and control systems. The SimHydraulics environment enables a user to describe multidomain systems containing connected hydraulic and mechanical components as physical networks. The SimHydraulics environment provides a representative library of hydraulic components and building blocks that allows a user to implement other components. SimHydraulics can be used for a variety of automotive, aerospace, defense, and industrial equipment applications, such as modeling automatic transmissions, actuating flight control surfaces, and actuating heavy equipment.

In another embodiment, the action language may be textual. For example, Modelica syntax may be employed. The language may allow non-causal relationships and/or constraints, such as, for example, equalities. For example, the behavior of an electrical resistor may be specified as V=R*I, stating that the voltage drop equals the current flow times the resistive value. Depending on how the resistor is connected, this equation may be used to compute a voltage (if the resistor is driven by a current) or it may be used to compute a current (if the resistor is driven by a voltage). In case of the voltage driven scenario, the equation used will be V=R*I whereas in case of the current driven scenario, the equations used will be I=V/R.

Determining the causal form of the equations that specify the behavior of components is done by a compiler and may be performed globally or locally. In case of global or semi-local processing, the equations of different components are aggregated and processed to obtain the desired causal form. This may require information about the variables that are part of equations across different components. Because equations across components are aggregated into one system of equations, optimizations such as eliminating local variables and equation reduction can be implemented. Furthermore, the occurrences of algebraic relations can be reduced.

As a result of the processing, relations from one component may be interspersed with relations from another component. To illustrate, a component may model a voltage source with relation Vout=Vin, with Vin the source input voltage. Another component may model a load that contains a resistive and a capacitive behavior with resistive parameter R and capacitive parameter C. This could be modeled by a relation for the current of the resistive effect, I=(Vr−Vc)/R for the resistive effect and a relation for the voltage across the capacitive effect Vc=Q/C for the capacitive effect. The charge Q is the stored quantity of the capacitive effect and so I=dQ/dt, the time derivative of Q. The connection relations may be such that the positive voltage of the resistive effect Vr=Vout. When these relations are combined, they may be interspersed to arrive at a combined specification:

$Vc=Q/C$ $Vout=Vin$ $Vr=Vout$ $I=(Vr-Vc)/R$ with the state update equation:

$dQ/dt=I$

Here, the relation of the voltage source component, Vout=Vin, is interspersed with the relations of the load, Vc=Q/C and I=(Vr−Vc)/R, as well as the connection relation, Vr=Vout.

Because the current of the load, I, is the same as the current of the voltage source, this could be included as an additional connection relation, Iin=I. The connection would then consist of a voltage/current pair, (V, I), which constitutes an across and a through variable. If further connections were made to this connector, the voltage would be equal among all connections and the currents would be balanced, sum to 0.

The relations could be formulated in their causal form, but, in general may be provided in a non-causal form. For example, instead of I=(Vr−Vc)/R, the relation may be provided as a constraint Vr−Vc=R*I. Given the input variables and state variables, the causal form of such a constraint can be derived.

Likewise, in case part or all of the action language is algorithmic, for example a C program or Modelica algorithm, semi-local or global processing may provide improved computations. Optimizations such as loop unrolling, constant propagation, expression folding, local variable elimination, etc. can be implemented in cross component processing.

The optimization of algorithm and relation specifications may be performed based on an intermediate representation (IR). This IR may be a control flow graph, a data flow graph, or a combination. Using the IR of a relation specification and of an algorithm specification in two different components, an optimization can be employed that is based on the combined separate specifications.

Figure 8:
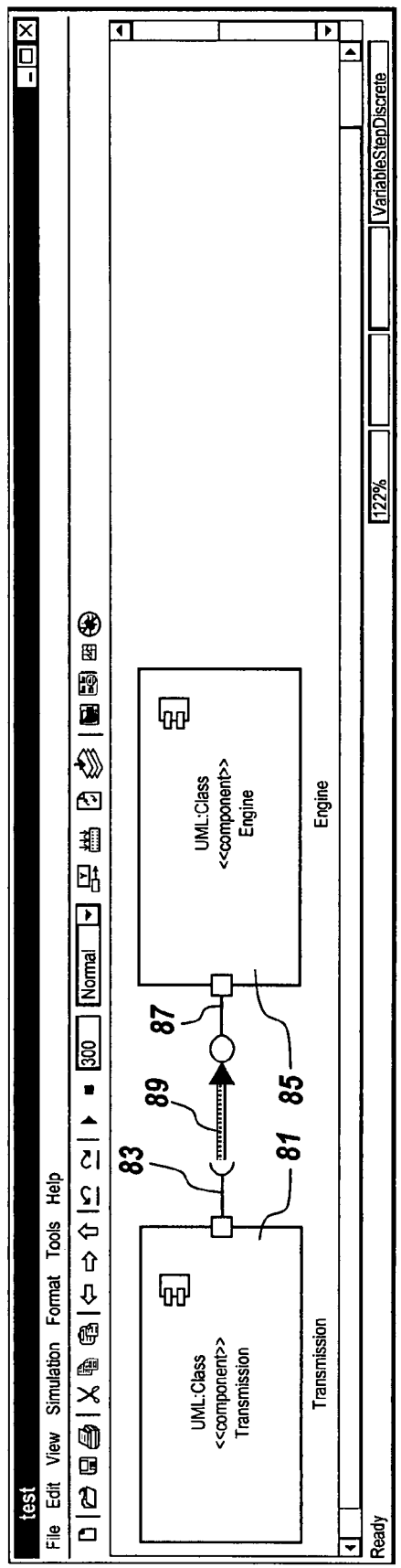
FIG. 8 is an exemplary graphical model that corresponds to a UML model.

After realizing the operations and physical connections in the graphical programming environment, the user may connect the published components to execute the model, as depicted in FIG. 8. FIG. 8 shows an exemplary graphical model that contains two instances of components, also referred to as runtime objects, that are linked through their compliant requester/provider interfaces. During execution, the 'requester' object may call an operation of the 'provider' object that it is linked to. To this end, the operations are defined in the interface. This component 'object' diagram can be simulated once the operations that are called have been realized in the graphical programming environment.

In FIG. 8, the interface 83 of the Transmission block 81 is coupled to the interface 87 of the Engine block 85. The coupling 89 is implemented as a bus, which is a set of connections. Each of the connections may be a bus as well, which supports hierarchical structuring of sets of connections. The variables that are associated with a connection (also called signals in the Simulink® environment) may be arranged such that they are contiguous in memory when a computable representation is derived. If the data type of each of the connection variables is the same, the set of connections can be represented as an array, which allows for direct indexing. In general, a set of connections can be represented as a structure in generated code and named access to each of the connection variables can be employed. The dot notation can be used to access hierarchically ordered connections. For example, if a set that consist of elements X and Y is called a bus B and X is a bus itself that represents the set of connections M and N, then the connection variable of M can be accessed by the B.X.M notation. The skilled practitioner in the art will recognize that other syntax and general set notation as well as operation semantics (such as set comprehensions) can apply.

Other information may be included in the component interface. For example, timing information such as sample rates of interface elements can be included. More complex timing constraints can be included as well. For example, a timed automaton can be employed to capture sequential temporal characteristics of behavior such as, for example, a restriction that a value changes its value within a certain time frame after another change in value. Other restrictions may be that a variable always attains a certain value or one of a set of values at some point in time, that it never attains a certain value or one of a set of values, that it always attains a certain value or one of a set of value within a time frame after one value or a set of values, etc. The restrictions may be implemented as assertions, assumptions, or with any other language element interpretation.

Other information that may be included in the component interface includes protocol information. For example, a message sequence chart may be employed to prescribe a request/acknowledge communication between two components.

Interface connections that are incompatible may be disallowed during editing of the model. For example, if the timing information of two connectors, their type, their protocols, or any other interface characteristic does not match, the connection may not be possible in a modeling environment. In other embodiments, the connection may be allowed during edit time, but when the model is analyzed for correctness, an error may result. Alternatively, a warning may be issued and the conflict may be resolved according to one or a set of rules.

In an exemplary embodiment, the interface specification is represented by a bus. This set of connections then may include the set of arguments of a function call, which may be structured data types themselves and be passed by reference or value. The function-call initiator may be represented by a bus as well and the return value of the function call can be represented by a bus. Different permutations of combinations are possible and so the function-call initiator may be included in the same bus as the function arguments and the return value. This results in a bidirectional bus because the elements in the set of connections have mixed computational causality, one connection may be the input to a block while another connection in the set of connections is output of said block.

With the realization of the components of the UML model 5 (see FIG. 1), the graphical programming environment 8 may simulate or execute a deployment diagram of the UML model 5. A deployment diagram is one of UML diagrams that serves to model the hardware used in system implementations and the associations between those components. The elements used in deployment diagrams are nodes, components and associations. Therefore, the simulation or execution of the deployment diagram assesses performance and schedulability requirement of run-time processing nodes against the time and numerical resolution of control and signal processing algorithms with safety and reliability constraints.

Figure 9:
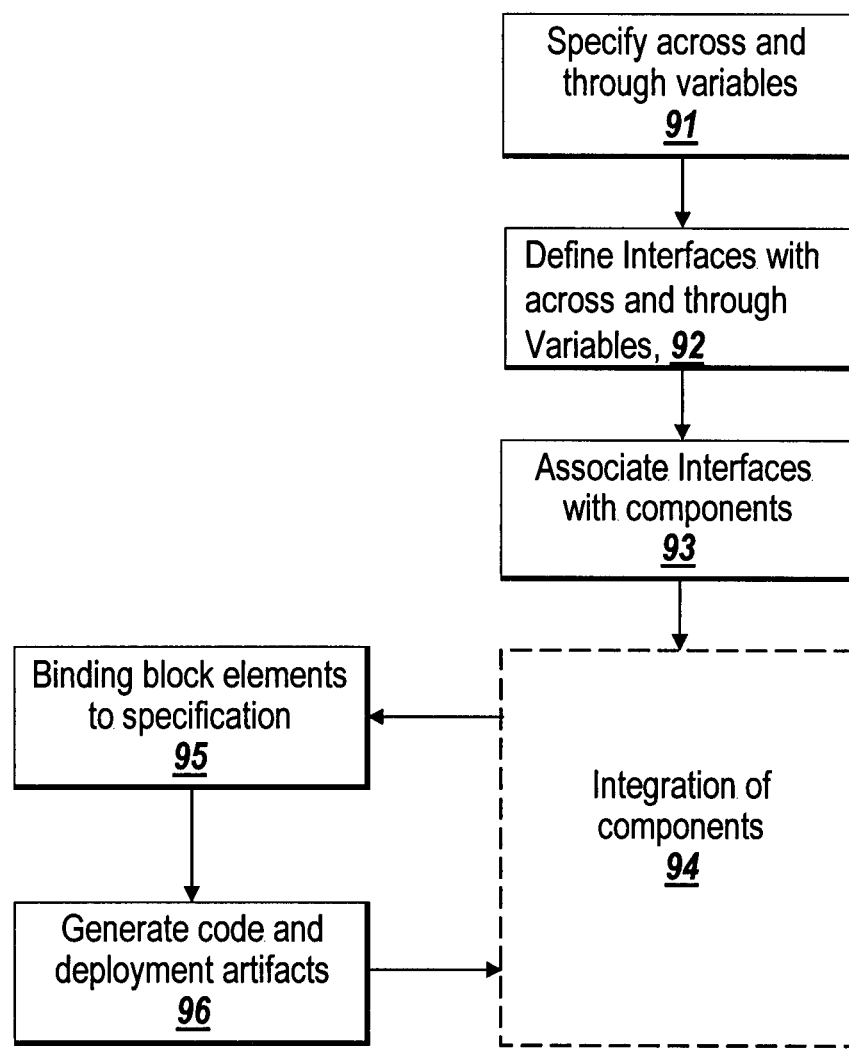
FIG. 9 shows an exemplary proceeding of an exemplary embodiment.

FIG. 9 shows an exemplary proceeding of an exemplary embodiment. A user may define across variables and through variables of a system in each domain of the system (step 91). A user can create and edit a UML model for the system. The user may specify and connect components of the UML model using UML tools that the UML modeling environment 4 provides. The user may define the interfaces of the components in the UML model of the system with the across variables and through variables of the system (step 92). The interfaces may also be defined to include the properties and operations of the components. The interfaces are associated with the corresponding components in the UML model (step 93). In order to realize the UML model or the components of the UML model so that the UML model can be executed, the UML model or a representation of it is sent to the graphical programming environment 8 (step 94). A realization of a part of the UML model that has been provided by code such as C, C++, Java, Python, and FORTRAN can be represented in the graphical programming environment 8 by embedding it into S-function interface code or a "legacy code" block or other code blocks. This wrapper code is then called from the graphical model environment 8 during execution or for alternate analysis purposes such as data type propagation, trimming, linearization, verification, and decision coverage.

The graphical programming environment 8 enables a user to design, simulate, implement or test the dynamic features of a system. The graphical programming environment 8 receives the UML model and binds its elements to the specification of the interfaces of the components in the UML model to represent the UML model or the components of the UML model in the graphical programming environment 8 (step 95). The representation of the UML model or the components of the UML model enables the user to realize the methods of the UML model or the components of the UML model in the graphical programming environment 8. The graphical programming environment 8 can then simulate or execute the model to determine the dynamic, numerical and real-time behavior of the model. The graphical programming environment 8 can also generate code for the model so that the code can be deployed as embedded-software and on rapid-prototyping and/or hardware targets (step 96). Alternatively, mechanical, electrical, or other physics based implementations may be designed to the model specification.

Configuration mechanisms allow the generated code to be tailored to the needs and wishes of the user. For example, a data store memory block can be used to specify the memory location of a variable. Alternate mechanisms to specify the memory location of a variable exist and include the location as part of its data type or being read from an external file, database, external storage, etc. Further configuration mechanisms include directives for the code generation such as whether a function in software should have its arguments passed in or whether it should be global and whether the function data should be kept local to the function or whether it can be stored at the model level. Similarly, it can be specified whether a function should be reusable, the order of the arguments on the argument list, whether structured data types should be employed for each of the arguments or whether they should be a flat list, which include files to use to obtain externally defined data types, and the like.

In an exemplary embodiment, a UML model, which defines components with specific interfaces, may be implemented from a searchable database of implementations with compatible interfaces. The database may be searchable on variant, e.g., an engine and a transmission for a specific vehicle. The database may also be searchable by fidelity, such as high, medium, and low fidelity. In an exemplary embodiment, the UML modeling environment may be coupled to a Product Lifecycle Management (PLM) tool, a version control tool, such as, for example, Code Versioning System (CVS), or Software Configuration Management (SCM) tool. The PLM tool is a software tool used for mechanical design, analysis and manufacturing to support products from when they are first conceived through distribution and retirement. The PLM tool may be assembled from various software programs, rather than purchased as a single commercial product. The PLM tool may manage product specifications and formulas, provide production histories, create complete product genealogies, and track total product quality. The SCM tool is a management tool for a software design project as it evolves into a software product or system. The management includes technical aspects of the project and the control of modifications changes to the project plan by the programmers during the development phase.

Since changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method comprising:
    defining, in a software architecture modeling environment used for designing a software architecture, across and through variables of a system based on user input,
        the software architecture modeling environment using at least one of Unified Modeling Language (UML), SysML, or Advanced Architecture Description Language (AADL) to model the software architecture, and
        the defining the across and through variables being performed by a computing device;
    generating, in the software architecture modeling environment, a model of a system,
        the model including a first element representing a first physical component included in the system and a second element representing a second physical component included in the system,
        the model including at least one of a class, an object that is an instance of the class, or a link that is an instance of an association, and
        the generating the model being performed by the computing device;
    creating, in the software architecture modeling environment, a first physical component interface and a second physical component interface between the first element and the second element based on the across and through variables,
        the first physical component interface and the second physical component interface specifying continuous time connections, between the first element and the second element, associated with the across and through variables, and
        the creating the first physical component interface and the second physical component interface being performed by the computing device;
    associating, in the software architecture modeling environment, the first physical component interface with the first element in the model,
        the associating the first physical component interface being performed by the computing device;
    associating, in the software architecture modeling environment, the second physical component interface with the second element in the model,
        the associating the second physical component interface being performed by the computing device;
    importing the model into a graphical programming environment,
        the importing the model being performed by the computing device; and
    executing, in the graphical programming environment, the model,
        the graphical programming environment enabling a behavior to be generated for the first element and the second element, of the model generated in the software architecture modeling environment, using the across and through variables associated with terminals based on the first physical component interface and the second physical component interface, and
    the executing the model being performed by the computing device.

2. The method of claim 1, further comprising:
    determining a variable associated with at least one of the first physical component interface or the second physical component interface,
    where the variable comprises at least one of:
        a position variable in a translational mechanical system,
        an angle variable in a rotational mechanical system,
        a pressure variable in a hydraulic system,
        a voltage variable in an electrical system, or
        a temperature variable in a thermal system.

3. The method of claim 1, further comprising:
    determining a variable associated with at least one of the first physical component interface or the second physical component interface, where the variable comprises at least one of:
        a force variable in a translation mechanical system,
        a torque variable in a rotational mechanical system,
        a flow rate variable in a hydraulic system,
        a current variable in an electrical system,
        an enthalpy flow, or
        a heat flow variable in a thermal system.

4. The method of claim 1, where the model is a UML model.

5. The method of claim 1, where the model is a UML model,
    where the model is associated with a graphical model that includes a first graphical model element representing the first physical component, a second graphical model element representing the second physical component, a third graphical model element representing the first physical component interface, and a fourth graphical model element representing the second physical component interface, and
    where the method further comprises generating the graphical model in the graphical programming environment, and
    where generating the graphical model includes:
        generating, in the graphical programming environment, one or more hierarchical graphical blocks representing one or more of the first element or the second element included in the UML model.

6. The method of claim 1, further comprising:
    determining a first variable and a second variable associated with at least one of the first physical component interface or the second physical component interface,
    where determining the first variable and the second variable includes:
        determining the first variable and the second variable based on computer-aided design (CAD) data, associated with the model, that defines a geometric compatibility of the first physical component and the second physical component.

7. The method of claim 1, where the model is associated with a graphical model that includes a first graphical model element representing the first physical component, a second graphical model element representing the second physical component, a third graphical model element representing the first physical component interface, and a fourth graphical model element representing the second physical component interface,
  where the graphical model is generated in the graphical programming environment, and
  where the graphical programming environment comprises at least one of:
    a time-based block diagram environment,
    a state-based and flow diagram environment, or
    a physical modeling environment.

8. The method of claim 1, further comprising:
generating a text-based format of the model,
where generating the text-based format of the model includes:
  including information identifying a first variable and a second variable, associated with at least one of the first physical component interface or the second physical component interface, in the text-based data format of the model.

9. The method of claim 1, where the model is associated with a graphical model that includes a first graphical model element representing the first physical component, a second graphical model element representing the second physical component, a third graphical model element representing the first physical component interface, and a fourth graphical model element representing the second physical component interface,
  the method further comprising:
    receiving, via the software architecture modeling environment, information identifying a specification of a behavior of one or more connections between the first physical component and the second physical component; and
    generating the graphical model,
      where generating the graphical model includes:
        generating the third graphical model element based on the behavior of the one or more connections.

10. The method of claim 9, where receiving the information identifying the specification of the behavior includes:
  receiving information identifying a temporal behavior of the one or more connections between the first physical component and the second physical component.

11. The method of claim 1, where the model is associated with a graphical model that includes a first graphical model element representing the first physical component, a second graphical model element representing the second physical component, a third graphical model element representing the first physical component interface, and a fourth graphical model element representing the second physical component interface,
  the method further comprising:
    generating the graphical model,
      where generating the graphical model includes:
        determining one or more characteristics of a behavior of a connection between the first physical component and the second physical component based on one or more elements, included in the model, that are different from the first element and the second element.

12. The method of claim 1, where the model is associated with a graphical model that includes a first graphical model element representing the first physical component, a second graphical model element representing the second physical component, a third graphical model element representing the first physical component interface, and a fourth graphical model element representing the second physical component interface,
  where the graphical model is generated in the graphical programming environment, and
  where the graphical programming environment enables a user to generate code, for the model, that supports at least one of the first physical component interface or the second physical component interface.

13. A non-transitory computer-readable medium storing instructions, the instructions comprising:
  one or more instructions that, when executed by a computing device, cause the computing device to:
    define, in a software architecture modeling environment used for designing a software architecture, across and through variables of a system based on user input,
      the software architecture modeling environment using at least one of Unified Modeling Language (UML), SysML, or Advanced Architecture Description Language (AADL) to model the software architecture;
    generate a model of a system in the software architecture modeling environment,
      the model including at least one of a class, an object that is an instance of the class, or a link that is an instance of an association;
    connect a first element of the model and a second element of the model,
      the first element representing a first physical component of the system and the second element representing a second physical component of the system;
    create, in the software architecture modeling environment, a first physical component interface and a second physical component interface between the first element and the second element based on the across and through variables,
      the first physical component interface and the second physical component interface specifying continuous time connections, between the first element and the second element, associated with the across and through variables;
    associate, in the software architecture modeling environment, the first physical component interface with the first element in the model;
    associate, in the software architecture modeling environment, the second physical component interface with the second element in the model;
    import the model into a graphical programming environment; and
    execute, in the graphical programming environment, the model,
      the graphical programming environment enabling a behavior to be generated for the first element and the second element, of the model generated in the software architecture modeling environment, using the across and through variables associated with terminals based on the first physical component interface and the second physical component interface.

14. The non-transitory computer-readable medium of claim 13, where the instructions further comprise one or more instructions that, when executed by a computing device, cause the computing device to determine a first variable associated with at least one of the first physical component interface or the second physical component interface, and
    where the first variable comprises at least one of:
        a position variable in a translational mechanical system,
        an angle variable in a rotational mechanical system,
        a pressure variable in a hydraulic system,
        a voltage variable in an electrical system, or
        a temperature variable in a thermal system.

15. The non-transitory computer-readable medium of claim 13, where the instructions further comprise one or more instructions that, when executed by a computing device, cause the computing device to determine a second variable associated with at least one of the first physical component interface or the second physical component interface, and
    where the second variable comprises at least one of:
        a force variable in a translation mechanical system,
        a torque variable in a rotational mechanical system,
        a flow rate variable in a hydraulic system,
        a current variable in an electrical system, or
        a heat flow variable in a thermal system.

16. The non-transitory computer-readable medium of claim 13, where the model is a UML model.

17. The non-transitory computer-readable medium of claim 13, where the model is a UML model,
    where the instructions further comprise one or more instructions that, when executed by the computing device, cause the computing device to generate a graphical model in the graphical programming environment, and
    where the one or more instructions to generate the graphical model include:
        one or more instructions that, when executed by the computing device, cause the computing device to generate, in the graphical programming environment, one or more hierarchical graphical blocks representing one or more of the first element or the second element included in the UML model.

18. The non-transitory computer-readable medium of claim 16, where the instructions further comprise one or more instructions that, when executed by a computing device, cause the computing device to determine a first variable and a second variable associated with at least one of the first physical component interface or the second physical component interface, and
    where the one or more instructions to determine the first variable and the second variable include:
        one or more instructions that, when executed by the computing device cause the computing device to:
            determine the first variable and the second variable based on computer-aided design (CAD) data, associated with the model, that defines a geometric compatibility of the first physical component and the second physical component.

19. The non-transitory computer-readable medium of claim 13, where the graphical model is generated in the graphical programming environment, and
    where the graphical programming environment comprises at least one of:
        a time-based block diagram environment,
        a state-based and flow diagram environment, or
        a physical modeling environment.

20. The non-transitory computer-readable medium of claim 13, where the instructions further comprise:
    one or more instructions that, when executed by the computing device, cause the computing device to include information identifying a first variable and a second variable, associated with at least one of the first physical component interface or the second physical component interface, in a text-based format of the model.

21. The non-transitory computer-readable medium of claim 13, where the instructions further comprise one or more instructions that, when executed by a computing device, cause the computing device to determine a first variable and a second variable associated with at least one of the first physical component interface or the second physical component interface, and
    where the one or more instructions to determine the first variable and the second variable include:
        one or more instructions that, when executed by the computing device, cause the computing device to:
            receive, via the software architecture modeling environment, information identifying a specification of a behavior of one or more connections between the first physical component and the second physical component, and
            generate the at least one of the first physical component interface or the second physical component interface further based on the specification of the behavior of the one or more connections.

22. The non-transitory computer-readable medium of claim 17, where the behavior is a temporal behavior.

23. The non-transitory computer-readable medium of claim 13, where the instructions further comprise one or more instructions that, when executed by a computing device, cause the computing device to generate a graphical model, and
    where the one or more instructions to generate the graphical model include:
        one or more instructions that, when executed by the computing device, cause the computing device to:
            determine characteristics of a behavior of a connection between the first physical component and the second physical component based on one or more elements, included in the model, that are different from the first element and the second element.

24. The non-transitory computer-readable medium of claim 13,
    where the graphical programming environment enables a user to generate code, for the model, that supports the first physical component interface or the second physical component interface.

25. A system comprising:
a processor to:
    define, in a software architecture modeling environment used for designing a software architecture, across and through variables of a system based on user input,
        the software architecture modeling environment using at least one of Unified Modeling Language (UML), SysML, or Advanced Architecture Description Language (AADL) to model the software architecture;
    generate a model of a system in the software architecture modeling environment,
        the model including at least one of a class, an object that is an instance of the class, or a link that is an instance of an association;
    connect a first element of the model and a second element of the model, the first element representing a first physical component included in the system and the second element representing a second physical component included in the system;

create, in the software architecture modeling environment, a first physical component interface and a second physical component interface between the first element and the second element based on the across and through variables, the first physical component interface and the second physical component interface specifying continuous time connections, between the first element and the second element, associated with the across and through variables;

associate, in the software architecture modeling environment, the first physical component interface with the first element in the model;

associate, in the software architecture modeling environment, the second physical component interface with the second element in the model;

import the model into a graphical programming environment and execute, in the graphical programming environment, the model, the graphical programming environment enabling a behavior to be generated for the first element and the second element, of the model generated in the software architecture modeling environment, using the across and through variables associated with terminals based on the first physical component interface and the second physical component interface.

26. The system of claim 25, where the model is a UML model.

27. The system of claim 25, where an across variable, of the across and through variables and associated with the first physical component interface, includes one or more of:
a position variable in a translational mechanical system,
an angle variable in a rotational mechanical system,
a pressure variable in a hydraulic system,
a voltage variable in an electrical system, or
a temperature variable in a thermal system, and
where a through variable, of the across and through variables and associated with the second physical component interface, includes one or more of:
a force variable in a translation mechanical system,
a torque variable in a rotational mechanical system,
a flow rate variable in a hydraulic system,
a current variable in an electrical system,
an enthalpy flow, or
a heat flow variable in a thermal system.

28. The system of claim 25, where the processor is further to:
determine other across and through variables, associated with at least one of the first physical component interface or the second physical component interface, based on computer-aided design (CAD) data, associated with the model, that defines a geometric compatibility of the first physical component and the second physical component.

29. A non-transitory computer-readable medium storing instructions, the instructions comprising:
one or more instructions that, when executed by a computing device, cause the computing device to:
obtain information regarding a model of a system generated in a software architecture modeling environment used for designing a software architecture,
the information indicating across and through variables of the system defined based on user input,
the model including a first element representing a first physical component of the system, a second element representing a second physical component of the system, and physical component interfaces between the first element and the second element created based on the across and through variables,
the physical component interfaces specifying continuous time connections, between the first element and the second element, based on the across and through variables in the software architecture modeling environment,
the model including at least one of a class, an object that is an instance of the class, or a link that is an instance of an association, and
the software architecture modeling environment using at least one Unified Modeling Language (UML), SysML, or Advanced Architecture Description Language (AADL) to model the software architecture;
generate a graphical model, of the system, in a graphical programming environment,
the graphical model being generated based on the information regarding the model,
the graphical model including a first graphical model element representing the first physical component, a second graphical model element representing the second physical component, and a third graphical model element representing the physical component interfaces between the first element and the second element, and
the graphical programming environment enabling a behavior to be generated for the first element and the second element, of the model generated in the software architecture modeling environment, using terminals associated with the across and through variables based on the physical component interfaces; and
execute the graphical model in the graphical programming environment.

30. The non-transitory computer-readable medium of claim 29, where the one or more instructions to generate the graphical model include:
one or more instructions to generate, in the graphical programming environment, one or more hierarchical graphical blocks representing one or more of the first element or the second element included in the model.

31. The non-transitory computer-readable medium of claim 29, where the one or more instructions to generate the graphical model include:
one or more instructions to determine one or more characteristics of a behavior of a connection between the first physical component and the second physical component based on one or more elements, included in the model, that are different from the first element and the second element.

32. The non-transitory computer-readable medium of claim 29, where the instructions further comprise one or more instructions to determine a first variable and a second variable associated with the physical component interfaces,
where the first variable comprises at least one of:
a position variable in a translational mechanical system,
an angle variable in a rotational mechanical system,
a pressure variable in a hydraulic system, a voltage variable in an electrical system, or
a temperature variable in a thermal system, and
where the second variable comprises at least one of:
   a force variable in a translation mechanical system,
   a torque variable in a rotational mechanical system,
   a flow rate variable in a hydraulic system,
   a current variable in an electrical system,
   an enthalpy flow, or
   a heat flow variable in a thermal system.

* * * * *

UNITED STATES PATENT AND TRADEMARK OFFICE
CERTIFICATE OF CORRECTION

| | | |
|---|---|---|
| PATENT NO. | : 10,181,059 B1 | Page 1 of 1 |
| APPLICATION NO. | : 11/820551 | |
| DATED | : January 15, 2019 | |
| INVENTOR(S) | : Nathan E. Brewton et al. | |

It is certified that error appears in the above-identified patent and that said Letters Patent is hereby corrected as shown below:

In the Specification

Column 1, Line 52:
"described with multiple pairs. For. example, a pneumatic"
Should read:
--described with multiple pairs. For example, a pneumatic--

In the Claims

Column 22, Line 29:
"claim 17, where the behavior is a temporal behavior."
Should read:
--claim 21, where the behavior is a temporal behavior.--

Signed and Sealed this
First Day of July, 2025

Coke Morgan Stewart
*Acting Director of the United States Patent and Trademark Office*